United States Patent
Ogino et al.

(10) Patent No.: US 9,233,871 B2
(45) Date of Patent: Jan. 12, 2016

(54) OPTICAL GLASS AND CORE MATERIAL FOR OPTICAL FIBER

(75) Inventors: Michiko Ogino, Kanagawa (JP); Masahiro Onozawa, Kanagawa (JP)

(73) Assignee: OHARA INC. (JP)

(*) Notice: Subject to any disclaimer, the term of this patent is extended or adjusted under 35 U.S.C. 154(b) by 44 days.

(21) Appl. No.: 13/504,639

(22) PCT Filed: Oct. 28, 2010

(86) PCT No.: PCT/JP2010/069187
§ 371 (c)(1), (2), (4) Date: Apr. 27, 2012

(87) PCT Pub. No.: WO2011/052688
PCT Pub. Date: May 5, 2011

(65) Prior Publication Data
US 2012/0220442 A1 Aug. 30, 2012

(30) Foreign Application Priority Data

Oct. 30, 2009 (JP) .................................. 2009-251392
May 28, 2010 (JP) .................................. 2010-123398

(51) Int. Cl.
*C03C 3/095* (2006.01)
*C03C 3/062* (2006.01)
*C03C 4/00* (2006.01)
*C03C 13/04* (2006.01)

(52) U.S. Cl.
CPC ............ *C03C 3/095* (2013.01); *C03C 3/062* (2013.01); *C03C 4/0078* (2013.01); *C03C 13/046* (2013.01)

(58) Field of Classification Search
CPC ........ C03C 3/062; C03C 3/066; C03C 3/095; C03C 13/046
USPC ................................ 501/37, 38, 64, 73, 78, 79
See application file for complete search history.

(56) References Cited

U.S. PATENT DOCUMENTS

| | | | | |
|---|---|---|---|---|
| 3,460,954 A * | 8/1969 | Young | 501/63 |
| 3,503,764 A * | 3/1970 | Young | 501/51 |
| 3,513,004 A * | 5/1970 | Pfaender et al. | 501/78 |
| 4,390,638 A * | 6/1983 | Mennemann et al. | 501/77 |
| 4,932,752 A * | 6/1990 | Krashkevich et al. | 385/142 |
| 5,932,501 A * | 8/1999 | Brocheton | 501/64 |
| 5,952,256 A * | 9/1999 | Morishita et al. | 501/63 |
| 6,196,684 B1 * | 3/2001 | Comte et al. | 351/159.41 |
| 6,217,971 B1 * | 4/2001 | Wolff et al. | 428/846.3 |
| 6,284,687 B1 * | 9/2001 | Comte et al. | 501/75 |
| 6,333,288 B1 * | 12/2001 | Clement et al. | 501/78 |
| 6,627,569 B1 * | 9/2003 | Naumann et al. | 501/70 |
| 6,630,420 B1 * | 10/2003 | Naumann et al. | 501/70 |
| 6,713,419 B1 * | 3/2004 | Onozawa et al. | 501/78 |
| 6,846,762 B2 * | 1/2005 | Mashiko et al. | 501/65 |
| 7,169,470 B2 * | 1/2007 | Wolff et al. | 428/375 |
| 8,329,602 B2 * | 12/2012 | Ogino | 501/37 |
| 8,546,282 B2 * | 10/2013 | Kinoshita et al. | 501/37 |
| 2003/0191007 A1 | 10/2003 | Mashiko et al. | |
| 2004/0220038 A1 | 11/2004 | Wolff et al. | |
| 2004/0229743 A1 * | 11/2004 | Wolff et al. | 501/67 |
| 2006/0019815 A1 * | 1/2006 | Inoue et al. | 501/72 |
| 2007/0054794 A1 * | 3/2007 | Nagaoka et al. | 501/65 |
| 2007/0197367 A1 * | 8/2007 | Ogino | 501/77 |
| 2009/0067792 A1 * | 3/2009 | Curdt et al. | 385/115 |
| 2009/0163342 A1 * | 6/2009 | Kolberg et al. | 501/37 |
| 2010/0041539 A1 | 2/2010 | Nagaoka et al. | |
| 2010/0210753 A1 * | 8/2010 | Ritter et al. | 523/117 |
| 2010/0210755 A1 * | 8/2010 | Ritter et al. | 523/117 |

FOREIGN PATENT DOCUMENTS

| | | |
|---|---|---|
| CN | 1323281 A | 11/2001 |
| CN | 1448355 A | 10/2003 |
| CN | 1927750 A | 3/2007 |
| EP | 1452495 A2 | 9/2004 |
| JP | 60-046945 A | 3/1985 |
| JP | 6046945 | 3/1985 |
| JP | 02-293346 A | 4/1990 |
| JP | H02-293346 A | 12/1990 |
| JP | 2006-117504 A | 5/2006 |
| JP | 2009196878 A | 3/2009 |
| JP | 2009-529712 A | 8/2009 |
| JP | 2009529712 A | 8/2009 |
| JP | 2009-196878 A | 9/2009 |
| WO | 2007104300 A1 | 9/2007 |

OTHER PUBLICATIONS

International Search Report PCT/JP2010/069187 mailed Nov. 22, 2012.
Communication from European Patent Office containing Extended European Search Report issued to Application No. EP 10 82 6820.2, dated May 8, 2013, 5 pp.
Office Action issued to CN Application No. 201080048409.0, mailed Apr. 23, 2014.
Notice of Reasons for Rejection issued JP Application No. 2010-123398, mailed Jul. 15, 2014.

* cited by examiner

*Primary Examiner* — Anthony J Green
*Assistant Examiner* — Elizabeth A Bolden
(74) *Attorney, Agent, or Firm* — Cantor Colburn LLP

(57) ABSTRACT

Provided is optical glass that does not contain lead, which is an environmental pollutant. The optical glass is ideal for the transmission of light even after being exposed to X-rays, and has a high refractive index. The optical glass comprises, by mass % in terms of oxide versus the glass total mass, 1.0% to 60.0% of an $SiO_2$ component, and one or more selected from the group consisting of an $La_2O_3$ component, $ZrO_2$ component, $TiO_2$ component, $Nb_2O_5$ component, and $Ta_2O_5$ as essential components. The optical glass has a refractive index ($n_d$) of 1.50 or greater, and has a light intensity recovery rate of 45% or greater when the glass having been irradiated with X-rays with a dose of 2.5 Gy is irradiated with light of a xenon lamp for 11 hours.

14 Claims, No Drawings

OPTICAL GLASS AND CORE MATERIAL FOR OPTICAL FIBER

CROSS-REFERENCE TO RELATED APPLICATIONS

This application is the National Stage of International Application No. PCT/JP2010/069187, filed Oct. 28, 2010, which claims the benefit of Japanese Application No. 2010-123398, filed May 28, 2010, and Japanese Application No. 2009-251392, filed Oct. 30, 2009 the entire contents of each of which are incorporated by reference herein.

FIELD OF THE INVENTION

The present invention relates to an optical glass and a core material for optical fiber.

BACKGROUND OF THE INVENTION

In recent years, optical glasses excellent in light transmittance have been incorporated and used in various devices. Specifically, these optical glasses are employed for core parts of multi-component glass fibers used as light guides, image guides or industrial endoscopes, or glass lenses for i-line used in semiconductor exposure devices (see catalogues for i-line, published by Ohara Inc.).

It is necessary for the multi-component glass fibers that a material with a higher refractive index ($n_d$) is used for core parts in order to increase a light transmission intensity and a material with a lower refractive index is used for clad portions in order to raise a numerical aperture. Furthermore, it is important that transmittance is high over an entire visible range since optical fibers are often used for longer transmission routes and lower transmittance results in a larger transmission loss.

Patent Document 1 discloses an optical glass, used for core parts of multi-component glass fibers, which contains 34% to 49% of $SiO_2+B_2O_3$, 6% to 13% of $Na_2O+K_2O$, 10% to 30% of BaO, 6% to 16% of ZnO, 1% to 15% of $La_2O_3+ZrO_2$, and 0% to 20% of PbO on the basis of mass percent.

Patent Document 1: Japanese Unexamined Patent Application, Publication No. 2006-117504

SUMMARY OF THE INVENTION

Problems to be Solved by the Invention

However, in the field of light guides or industrial endoscopes in particular, an application has been investigated in which a glass is irradiated with X-rays and then light is transmitted through the glass to transmit the light. Since light transmittance decreases in glasses when irradiated with X-rays, light transmission becomes difficult.

Here, when glass contains lead, although the transmittance will decrease due to irradiation of X-rays and then the transmittance will be recovered by irradiation of a certain amount of source light, there is a problem that the glass contains lead of an environmental pollutant. On the other hand, when glass does not contain lead, recovery of the transmittance is difficult even by irradiation of source light once the transmittance has decreased due to irradiation of X-rays, therefore, there is a problem that the decrease of the transmittance due to irradiation of X-rays disturbs transmission of light.

The present invention has been made in view of the problems described above; and it is an object of the present invention to provide an optical glass which can be favorably used for transmission of light even after irradiation of X-rays, irrespective of the non-inclusion of lead of an environmental pollutant, and which also has a high refractive index.

Means for Solving the Problems

The present inventors have thoroughly investigated and tested to solve the problems described above; as a result, it has been found that a recovery rate of transmitted light intensity increases when source light is irradiated after X-ray irradiation while a refractive index ($n_d$) is raised by way of including an $SiO_2$ component in a predetermined range as an essential component, and also including at least one selected from the group consisting of a $La_2O_3$ component, a $ZrO_2$ component, a $TiO_2$ component, an $Nb_2O_5$ component and $Ta_2O_5$ as an essential component, thereby completing the present invention.

In a first aspect, there is provided an optical glass which includes an $SiO_2$ component of no less than 1.0% and no greater than 60.0% by mass percent based on total mass of the glass in terms of oxide composition, and at least one selected from the group consisting of a $La_2O_3$ component, a $ZrO_2$ component, a $TiO_2$ component, an $Nb_2O_5$ component and $Ta_2O_5$ as an essential component, and has a refractive index ($n_d$) of no less than 1.50, in which a light intensity recovery rate is no less than 45% when the glass having been irradiated with X-rays with a dose of 2.5 Gy is irradiated with light of a xenon lamp for 11 hours.

According to a second aspect of the present invention, in the optical glass according to the first aspect, the content of the $SiO_2$ component is no greater than 50.0% by mass percent based on total mass of the glass in terms of oxide composition.

According to a third aspect of the present invention, in the optical glass according to the first or second aspect, the optical glass includes 0% to 20.0% of the $La_2O_3$ component, and/or 0% to 20.0% of the $ZrO_2$ component, and/or 0% to 15.0% of the $TiO_2$ component, and/or 0% to 15.0% of the $Nb_2O_5$ component, and/or 0% to 10.0% of the $Ta_2O_5$ component by mass percent based on the total mass of the glass in terms of oxide composition.

According to a fourth aspect of the present invention, in the optical glass according to any one of the first to third aspects, the total content by mass of the at least one selected from the group consisting of the $La_2O_3$ component, the $ZrO_2$ component, the $TiO_2$ component, the $Nb_2O_5$ component, and the $Ta_2O_5$ component is no less than 1.0% and no greater than 30.0% by mass percent based on total mass of the glass in terms of oxide composition.

According to a fifth aspect of the present invention, in the optical glass according to any one of the first to fourth aspects, the content of the $La_2O_3$ component is greater than 4.0% by mass percent based on total mass of the glass in terms of oxide composition.

According to a sixth aspect of the present invention, in the optical glass according to any one of the first to fifth aspects, the optical glass further includes 0% to 15.0% of a $Li_2O$ component, and/or 0% to 20.0% of an $Na_2O$ component, and/or 0% to 10.0% of a $K_2O$ component by mass percent based on total mass of the glass in terms of oxide composition.

According to a seventh aspect of the present invention, in the optical glass according to sixth aspect, the content of the $Li_2O$ component is no greater than 5.0% by mass percent based on total mass of the glass in terms of oxide composition.

According to an eighth aspect of the present invention, in the optical glass according to the sixth or seventh aspect, the total mass of the $Rn_2O$ component (in which Rn is at least one selected from the group consisting of Li, Na, and K) is no greater than 20.0% by mass percent based on total mass of the glass in terms of oxide composition.

According to a ninth aspect of the present invention, in the optical glass according to any one of the sixth to eighth aspects, the total mass of $Na_2O+K_2O$ is no less than 0.1% and no greater than 20.0% by mass percent based on total mass of the glass in terms of oxide composition.

According to a tenth aspect of the present invention, in the optical glass according to any one of the first to ninth aspects, the optical glass further includes 0% to 10.0% of an MgO component, and/or 0% to 20.0% of a CaO component, and/or 0% to 20.0% of a SrO component, and/or 0% to 40.0% of a BaO component, and/or 0% to 20.0% of a ZnO component by mass percent based on total mass of the glass in terms of oxide composition.

According to an eleventh aspect of the present invention, in the optical glass according to the tenth aspect, the total mass of the RO component (in which R is at least one selected from the group consisting of Mg, Ca, Sr, Ba, and Zn) is no greater than 50.0% by mass percent based on total mass of the glass in terms of oxide composition.

According to a twelfth aspect of the present invention, in the optical glass according to the tenth or eleventh aspect, the content of the BaO component is less than 28.0% by mass percent based on total mass of the glass in terms of oxide composition.

According to a thirteenth aspect of the present invention, in the optical glass according to any one of the first to twelfth aspects, the optical glass further includes 0% to 15.0% of a $B_2O_3$ component and/or 0% to 3.0% of an $Al_2O_3$ component by mass percent based on total mass of the glass in terms of oxide composition.

According to a fourteenth aspect of the present invention, in the optical glass according to any one of the first to thirteenth aspects, the optical glass further includes 0% to 15.0% of a $Gd_2O_3$ component, and/or 0% to 10.0% of an $Y_2O_3$ component, and/or 0% to 10.0% of a $Yb_2O_3$ component, and/or 0% to 10.0% of a $Lu_2O_3$ component by mass percent based on total mass of the glass in terms of oxide composition.

According to a fifteenth aspect of the present invention, in the optical glass according to the fourteenth aspect, the total mass of the $Ln_2O_3$ component (in which Ln is at least one selected from the group consisting of La, Gd, Y, Yb, and Lu) is no greater than 20.0% by mass percent based on total mass of the glass in terms of oxide composition.

According to a sixteenth aspect of the present invention, in the optical glass according to any one of the first to fifteenth aspects, the optical glass further includes 0% to 15.0% of a $GeO_2$ component, and/or 0% to 15.0% of a $WO_3$ component, and/or 0% to 15.0% of a $Bi_2O_3$ component, and/or 0% to 15.0% of a $TeO_2$ component, and/or 0% to 1.0% of a $Sb_2O_3$ component by mass percent based on total mass of the glass in terms of oxide composition.

According to a seventeenth aspect of the present invention, in the optical glass according to any one of the first to sixteenth aspects, the optical glass contains substantially no lead compound or arsine compound.

According to an eighteenth aspect of the present invention, in the optical glass according to any one of the first to seventeenth aspects, internal transmittance at 395 to 400 nm thereof is no less than 0.9950.

According to a nineteenth aspect of the present invention, in the optical glass according to any one of the first to eighteenth aspects, having a refractive index ($n_d$) of no less than 1.60 and no greater than 2.00.

In a twentieth aspect of the present invention, there is provided a core material for optical fiber which is composed of the optical glass according to any one of the first to nineteenth aspects.

Effects of the Invention

In accordance with the present invention, by way of including the $SiO_2$ component in a predetermined range as an essential component, and also including at least one selected from the group consisting of the $La_2O_3$ component, the $ZrO_2$ component, the $TiO_2$ component, the $Nb_2O_5$ component and $Ta_2O_5$ as an essential component, the recovery rate of transmitted light intensity increases when source light is irradiated after X-ray irradiation while the refractive index ($n_d$) is raised. Therefore, there can be provided the optical glass which can be favorably used for transmission of light even after irradiation of X-rays, irrespective of the non-inclusion of lead of an environmental pollutant, and which also has a high refractive index.

DETAILED DESCRIPTION OF THE INVENTION

The optical glass of the present invention includes no less than 1.0% and no greater than 60.0% of the $SiO_2$ component by mass percent based on total mass of the glass in terms of oxide composition and at least one selected from the group consisting of the $La_2O_3$ component, the $ZrO_2$ component, the $TiO_2$ component and $Ta_2O_5$ as an essential component. By way of including the $SiO_2$ component in a predetermined range as an essential component, and also including at least one selected from the group consisting of the $La_2O_3$ component, the $ZrO_2$ component, the $TiO_2$ component, the $Nb_2O_5$ component and $Ta_2O_5$ as an essential component, the recovery rate of transmitted light intensity increases when source light is irradiated after X-ray irradiation while the refractive index ($n_d$) is raised. For this reason, there can be obtained an optical glass which exhibits a light intensity recovery rate of no less than 45% when the glass having been irradiated with X-rays with a dose of 2.5 Gy is irradiated with light of a xenon lamp for 11 hours and which has a high refractive index of no less than 1.50; and the core material for optical fiber using it.

Hereinafter, embodiments of the optical glass of the present invention are explained in detail, but the present invention is not limited to the embodiments below and may be carried out with appropriate modification within the scope of the invention. In addition, repeated explanations are occasionally omitted as appropriate, which does not limit the scope of the invention.

Glass Component

The composition ranges of the components of the optical glass in accordance with the present invention are explained below. In this specification, all of the contents of components are expressed in terms of mass percent based on total mass of the glass in the composition on oxide basis unless indicated otherwise. Here, the "composition on oxide basis" refers to a composition of components in the glass assuming that oxides, complex salts, metal fluorides, etc. used as raw materials of compositional components of the glass of the present invention are entirely decomposed into oxides when melted and the total mass of the generated oxides corresponds to 100% by mass.

Essential Components and Optional Components

The $SiO_2$ component is a glass-forming component, a component which enhances denitrification resistance during glass formation, a component which improves chemical resistance of the glass, and a component which enhances the recovery of transmitted light intensity through the glass upon irradiation of source light. Specifically, by adjusting the content of the $SiO_2$ component to no less than 1.0%, the recovery of transmitted light intensity through the glass is enhanced when source light is irradiated, thus the glass may be favorably used for applications where the glass is irradiated with X-rays. On the other hand, by adjusting the content of the $SiO_2$ component to no greater than 60.0%, decrease of the refractive index may be suppressed and also a lower glass transition temperature (Tg) may be assured. Accordingly, the lower limit of the content of the $SiO_2$ component based on total mass of the glass in the composition on oxide basis is preferably 1.0%, more preferably 10.0%, still more preferably 20.0%, and most preferably 25.0%; and the upper limit thereof is preferably 60.0%, more preferably 50.0%, and most preferably 45.0%. The $SiO_2$ component may be included into the glass using $SiO_2$, $K_2SiF_6$, or $Na_2SiF_6$ as a raw material, for example.

The $La_2O_3$ component is a component which raises the refractive index of the glass and improves properties such as hardness and Young's modulus; and an optional component of the optical glass of the present invention. Specifically, by adjusting the content of the $La_2O_3$ component to no greater than 20.0%, degradation of dispersion in the glass may be suppressed and devitrification resistance during glass formation may be enhanced. Accordingly, the upper limit of the content of the $La_2O_3$ component based on total mass of the glass in the composition on oxide basis is preferably 20.0%, more preferably 15.0%, and most preferably 12.0%. Additionally, technical disadvantage does not arise even when the $La_2O_3$ component is not included; however, when the $La_2O_3$ component is included at greater than 0%, a desired refractive index and the recovery capacity of transmitted light intensity upon irradiation of source light may be more easily obtained. Accordingly, the content of the $La_2O_3$ component based on total mass of the glass in the composition on oxide basis is preferably greater than 0%, more preferably greater than 1.0%, and most preferably greater than 4.0%. The $La_2O_3$ component may be included into the glass using $La_2O_3$ or $La(NO_2)_2$—$XH_2O$ (X: an arbitrary integer) as a raw material, for example.

The $ZrO_2$ component is a component which reduces devitrification during glass formation, raises the refractive index of the glass, and enhances a recovery capacity of transmitted light intensity upon irradiation of source light; and an optional component of the optical glass of the present invention. Specifically, by adjusting the content of the $ZrO_2$ component to no greater than 20.0%, devitrification resistance during glass formation may be enhanced and the glass may be easily melted at lower temperatures. Accordingly, the upper limit of the content of the $ZrO_2$ component based on total mass of the glass in the composition on oxide basis is preferably 20.0%, more preferably 15.0%, and most preferably 13.0%. The $ZrO_2$ component may be included into the glass using $ZrO_2$ or $ZrF_4$ as a raw material, for example.

The $TiO_2$ component is a component which raises the refractive index of the glass and enhances dispersion of the glass. Specifically, by adjusting the content of the $TiO_2$ component to no greater than 15.0%, coloring of the glass may be reduced. Accordingly, the upper limit of the content of the $TiO_2$ component based on total mass of the glass in the composition on oxide basis is preferably 15.0%, more preferably 12.0%, and most preferably 10.0%. From the viewpoint of reducing the coloring of the glass in particular and raising the internal transmittance of the glass near wavelength 400 nm in particular, the upper limit of the content of the $TiO_2$ component based on total mass of the glass in the composition on oxide basis is preferably 8.0%, more preferably 5.0%, and most preferably 3.0%. The $TiO_2$ component may be included into the glass using $TiO_2$ as a raw material, for example.

The $Nb_2O_5$ component is a component which raises the refractive index of the glass and enhances dispersion of the glass. Specifically, by adjusting the content of the $Nb_2O_5$ component to no greater than 15.0%, coloring of the glass may be reduced. Accordingly, the upper limit of the content of the $Nb_2O_5$ component based on total mass of the glass in the composition on oxide basis is preferably 15.0%, more preferably 12.0%, and most preferably 10.0%. The $Nb_2O_5$ component may be included into the glass using $Nb_2O_5$ as a raw material, for example.

The $Ta_2O_5$ component is a component which raises the refractive index of the glass and improves devitrification resistance of the glass; and an optional component of the optical glass of the present invention. Specifically, by adjusting the content of the $Ta_2O_5$ component to no greater than 10.0%, devitrification resistance during glass formation may be enhanced. Accordingly, the upper limit of the content of the $Ta_2O_5$ component based on total mass of the glass in the composition on oxide basis is preferably 10.0%, more preferably 5.0%, and most preferably 3.0%. The $Ta_2O_5$ component may be included into the glass using $Ta_2O_5$ as a raw material, for example.

It is preferred in the optical glass of the present invention that the total content by mass of at least one selected from the group consisting of the $La_2O_3$ component, the $ZrO_2$ component, the $TiO_2$ component, the $Nb_2O_5$ component, and the $Ta_2O_5$ component is no less than 1.0% and no greater than 30.0%. By adjusting the total content by mass to no less than 1.0%, a desired higher refractive index may be easily obtained, thus a desired light transmission intensity of glass fiber may be more easily obtained. On the other hand, by adjusting the total content by mass to no greater than 30.0%, devitrification resistance during glass formation may be enhanced. Here, by adjusting the total content by mass to the total content by mass of at least one selected from the group consisting of the $La_2O_3$ component, the $ZrO_2$ component, and the $Ta_2O_5$ component in particular, coloring of the glass may be further reduced and the glass may be imparted with a higher transmittance. Furthermore, by adjusting the total content by mass to the total content by mass of at least one selected from the group consisting of the $La_2O_3$ component, the $ZrO_2$ component, and the $Nb_2O_5$ component, the recovery of transmitted light intensity through the glass upon irradiation of source light may be further enhanced. Accordingly, the lower limit of total content by mass of at least one selected from the group consisting of the $La_2O_3$ component, the $ZrO_2$ component, the $TiO_2$ component, the $Nb_2O_5$ component, and the $Ta_2O_5$ component based on total mass of the glass in the composition on oxide basis is preferably 1.0%, more preferably 3.0%, and most preferably 5.0%; and the upper limit thereof is preferably 30.0%, more preferably 25.0%, still more preferably 20.0%, and most preferably 18.0%.

The $Li_2O$ component is a component which assures a lower glass transition temperature (Tg) and improves fusibility of the glass. Here, by adjusting the content of the $LiO_2$ component to no greater than 15.0%, devitrification resistance and mechanical strength of the glass may be enhanced and formation of optical fiber with a core-clad structure may be facilitated by suppressing an excessive increase of average linear expansion coefficient of the glass. Specifically, by adjusting the content of the $Li_2O$ component to no greater than 5.0%, degradation of the recovery capacity of transmitted light intensity upon irradiation of source light may be suppressed. Accordingly, the upper limit of the content of the $Li_2O$ component based on total mass of the glass in the composition on oxide basis is preferably 15.0%, more preferably 10.0%, still more preferably 5.0%, and most preferably 3.0%. The $Li_2O$ component may be included into the glass using $Li_2CO_3$, $LiNO_3$, or LiF as a raw material, for example.

The $Na_2O$ component is a component which lowers a glass transition temperature (Tg) and improves fusibility of the glass; and an optional component of the optical glass of the present invention. Specifically, by adjusting the content of the $Na_2O$ component to no greater than 20.0%, devitrification of the glass during press molding may be reduced and formation of optical fiber with a core-clad structure may be facilitated by suppressing an excessive increase of average linear expansion coefficient of the glass. Accordingly, the upper limit of the content of the $Na_2O$ component based on total mass of the glass in the composition on oxide basis is preferably 20.0%, more preferably 15.0%, still more preferably 12.0%, and most preferably 10.0%. In the present invention, technical disadvantage does not arise even when the $Na_2O$ component is not included; however, by adjusting the content of the $Na_2O$ component to greater than 0%, recovery capacity of transmitted light intensity upon irradiation of source light may be further enhanced. Furthermore, in the glass of the present invention containing the $SiO_2$ component in particular, an average linear expansion coefficient of the glass is increased, thus formation of optical fiber with a core-clad structure may be facilitated. Accordingly, the lower limit of the content of the $Na_2O$ component based on total mass of the glass in the composition on oxide basis is preferably greater than 0%, more preferably 1.0%, and most preferably 4.0%. The $Na_2O$ component may be included into the glass using $Na_2CO_3$, $NaNO_3$, NaF, or $Na_2SiF_6$ as a raw material, for example.

The $K_2O$ component is a component which lowers a glass transition temperature (Tg) to improve fusibility of the glass and enhances the recovery of transmitted light intensity through the glass upon irradiation of source light; and an optional component of the optical glass of the present invention. In the glass of the present invention containing the $SiO_2$ component in particular, it is also a component to increase an average linear expansion coefficient of the glass. Here, by adjusting the content of the $K_2O$ component to no greater than 10.0%, devitrification of the glass during press molding may be reduced. Furthermore, increase of an average linear expansion coefficient of the glass may be suppressed and formation of optical fiber with a core-clad structure may be facilitated. Accordingly, the upper limit of the content of the $K_2O$ component based on total mass of the glass in the composition on oxide basis is preferably 10.0%, more preferably 8.0%, and most preferably 5.0%. The $K_2O$ component may be included into the glass using $K_2CO_3$, $KNO_3$, KF, $KHF_2$, or $K_2SiF_6$ as a raw material, for example.

It is preferred in the optical glass of the present invention that the total content by mass of $Rn_2O$ (in which Rn is at least one selected from the group consisting of Li, Na, and K) is no greater than 20.0%. By adjusting the total content by mass to no greater than 20.0%, stability of the glass may be enhanced and denitrification of the glass may be reduced. Accordingly, the upper limit of total content by mass of the $Rn_2O$ component based on total mass of the glass in the composition on oxide basis is preferably 20.0%, more preferably 15.0%, and most preferably 12.0%. Additionally, the optical glass of the present invention may have desired properties even without containing the $Rn_2O$ component; however, a lower glass transition temperature (Tg) may be easily obtained and fusibility of the glass may be improved by adjusting the total content by mass of the $Rn_2O$ component to greater than 0%. Here, by defining Rn to be at least one selected from the group consisting of Na and K and adjusting the total content by mass to no less than 1.0%, recovery of transmitted light intensity through the glass upon irradiation of source light may be further enhanced. Accordingly, the lower limit of total content by mass of the $Rn_2O$ component based on total mass of the glass in the composition on oxide basis is preferably greater than 0%, more preferably 1.0%, and most preferably 4.0%.

Specifically, it is preferred in the optical glass of the present invention that the total content by mass of $Na_2O+K_2O$ is no less than 0.1% and no greater than 20.0%. Specifically, by adjusting the total content by mass of $Na_2O+K_2O$ to no less than 0.1%, while degradation of the recovery capacity of transmitted light intensity upon irradiation of source light may be suppressed, a lower glass transition temperature (Tg) may be easily obtained and fusibility of the glass may be improved. On the other hand, by adjusting the total content by mass of $Na_2O+K_2O$ to no greater than 20.0%, stability of the glass may be enhanced and thus devitrification of the glass may be reduced. Accordingly, the lower limit of the total content by mass of $Na_2O+K_2O$ based on total mass of the glass in the composition on oxide basis is preferably 0.1%, more preferably 1.0%, still more preferably 2.0%, and most preferably 4.0%; and the upper limit thereof is preferably 20.0%, more preferably 15.0%, and most preferably 12.0%.

The MgO component is a component which improves devitrification resistance of the glass and decreases viscosity of the glass when melted; and an optional component of the optical glass of the present invention. Specifically, by adjusting the content of the MgO component to no greater than 10.0%, devitrification resistance of the glass may be enhanced. Accordingly, the upper limit of the content of the MgO component based on total mass of the glass in the composition on oxide basis is preferably 10.0%, more preferably 8.0%, and most preferably 5.0%. The MgO component may be included into the glass using $MgCO_3$ or $MgF_2$ as a raw material, for example.

The CaO component is a component which improves fusibility and devitrification resistance of the glass, controls an optical constant of the glass, and lowers viscosity of the glass at a melting temperature; and an optional component of the optical glass of the present invention. Specifically, by adjusting the content of the CaO component to no greater than 20.0%, degradation of the recovery of transmitted light intensity through the glass upon irradiation of source light may be suppressed with improving devitrification resistance of the glass. Accordingly, the upper limit of the content of the CaO component based on total mass of the glass in the composition on oxide basis is preferably 20.0%, more preferably 10.0%, still more preferably 7.0%, and most preferably 5.0%. The CaO component may be included into the glass using $CaCO_3$ or $CaF_2$ as a raw material, for example.

The SrO component is a component which improves fusibility and devitrification resistance of the glass and controls an optical constant of the glass; and an optional component of the optical glass of the present invention. Specifically, by adjusting the content of the SrO component to no greater than 20.0%, devitrification resistance of the glass may be enhanced. Accordingly, the upper limit of the content of the SrO component based on total mass of the glass in the composition on oxide basis is preferably 20.0%, more preferably 10.0%, and most preferably 8.0%. The SrO component may be included into the glass using $Sr(NO_2)_2$ or $SrF_2$ as a raw material, for example.

The BaO component is a component which improves fusibility and devitrification resistance of the glass and controls an optical constant of the glass; and an optional component of the optical glass of the present invention. Here, by adjusting the content of the BaO component to no greater than 40.0%, degradation of the recovery of transmitted light intensity through the glass upon irradiation of source light may be suppressed with improving devitrification resistance of the glass. The effect may be more pronounced when the content of the BaO component is less than 28.0%. Accordingly, the upper limit of the content of the BaO component based on total mass of the glass in the composition on oxide basis is preferably 40.0%, more preferably 30.0%, still more preferably less than 28.0%, and most preferably 24.0%. The BaO component may be included into the glass using $BaCO_3$ or $Ba(NO_2)_2$ as a raw material, for example.

The ZnO component is a component which raises a refractive index while improving fusibility and devitrification resistance of the glass and lowers an average linear expansion coefficient of the glass; and an optional component of the optical glass of the present invention. Specifically, by adjusting the content of the ZnO component to no greater than 20.0%, devitrification resistance of the glass may be enhanced. Accordingly, the upper limit of the content of the ZnO component based on total mass of the glass in the composition on oxide basis is preferably 20.0%, more preferably 15.0%, and most preferably 12.0%. Here, technical disadvantage does not arise even when the ZnO component is not included; however, by adjusting the content of the ZnO component to greater than 0%, recovery of transmitted light intensity through the glass upon irradiation of source light may be further enhanced. Furthermore, the viscosity of the glass becomes lower when melted, thus dissolution of furnace materials etc. into the molten glass may be reduced due to lowering the melting temperature of the glass, consequently the transmittance of the glass may be further increased. Accordingly, the lower limit of the content of the ZnO component based on total mass of the glass in the composition on oxide basis is preferably greater than 0%, more preferably 1.0%, still more preferably 3.0%, and most preferably 5.0%. The ZnO component may be included into the glass using ZnO or $ZnF_2$ as a raw material, for example.

It is preferred in the optical glass of the present invention that the total content by mass of RO (in which R is at least one selected from the group consisting of Zn, Mg, Ca, Sr, and Ba) is no greater than 50.0%. By adjusting the total content by mass to no greater than 50.0%, devitrification resistance of the glass may be enhanced. Accordingly, the upper limit of total content by mass of the RO component based on total mass of the glass in the composition on oxide basis is preferably 50.0%, more preferably 40.0%, and most preferably 35.0%. Additionally, the optical glass of the present invention may have desired properties even without containing the RO component; however, by adjusting the total content by mass of the RO component to no less than 1.0%, desired optical properties of the glass may be more easily obtained with enhancing stability and suppressing denitrification of the glass. Accordingly, the lower limit of total content of the RO component based on total mass of the glass in the composition on oxide basis is preferably 1.0%, more preferably 5.0%, still more preferably 10.0%, and most preferably 20.0%.

The $B_2O_3$ component is a component which suppresses degradation of chemical resistance of the glass, lowers a glass transition temperature (Tg), and decreases an average linear expansion coefficient of the glass; and an optional component of the optical glass of the present invention. Here, by adjusting the content of the $B_2O_3$ component to no greater than 15.0%, particularly preferably no greater than 10.0%, degradation of the recovery of transmitted light intensity through the glass upon irradiation of source light may be suppressed. Accordingly, the upper limit of the content of the $B_2O_3$ component based on total mass of the glass in the composition on oxide basis is preferably 15.0%, more preferably 10.0%, still more preferably less than 5.0%, and most preferably 3.0%. The $B_2O_3$ component may be included into the glass using $H_3BO_3$, $Na_2B_4O_7$, $Na_2B_4O_7.10H_2O$, or $BPO_4$ as a raw material, for example.

The $Al_2O_3$ component is a component which upgrades chemical resistance of the glass, lowers viscosity of the glass when melted, and decreases an average linear expansion coefficient of the glass; and an optional component of the optical glass of the present invention. Specifically, by adjusting the content of the $Al_2O_3$ component to no greater than 3.0%, degradation of the recovery capacity of transmitted light intensity upon irradiation of source light may be suppressed. Accordingly, the upper limit of the content of the $Al_2O_3$ component based on total mass of the glass in the composition on oxide basis is preferably 3.0%, more preferably 2.0%, and most preferably 1.0%. The $Al_2O_3$ component may be included into the glass using $Al_2O_3$, $Al(OH)_3$, or $AlF_3$ as a raw material, for example.

The $Gd_2O_3$ component, the $Y_2O_3$ component, the $Yb_2O_3$ component, and the $Lu_2O_3$ component are components which achieve a high refractive index and improve properties such as hardness and Young's modulus. Specifically, by adjusting the content of the $Gd_2O_3$ component to no greater than 15.0%, or by adjusting each of the contents of the $Y_2O_3$, $Yb_2O_3$, and $Lu_2O_3$ components to no greater than 10.0%, degradation of dispersion in the glass may be suppressed and denitrification resistance during glass formation may be enhanced. Accordingly, the upper limit of the content of the $Gd_2O_3$ component based on total mass of the glass in the composition on oxide basis is preferably 15.0%, more preferably 10.0%, and most preferably 5.0%.

Furthermore, the upper limit of each of the contents of the $Y_2O_3$, $Yb_2O_3$, and $Lu_2O_3$ components based on total mass of the glass in the composition on oxide basis is preferably 10.0%, more preferably 8.0%, and most preferably 5.0%. The $Gd_2O_3$, $Y_2O_3$, $Yb_2O_3$, and $Lu_2O_3$ components may be included into the glass using $Gd_2O_3$, $GdF_3$, $Y_2O_3$, $YF_3$, $Yb_2O_3$, or $Lu_2O_3$ as a raw material, for example.

It is preferred in the optical glass of the present invention that the total content by mass of the $Ln_2O_3$ component is no greater than 15.0% (in which Ln is at least one selected from the group consisting of La, Gd, Y, Yb, and Lu). By adjusting the total content by mass to no greater than 15.0%, degradation of dispersion in the glass may be suppressed and denitrification resistance during glass formation may be enhanced. Accordingly, the upper limit of total content by mass of the $Ln_2O_3$ component based on total mass of the glass in the composition on oxide basis is preferably 15.0%, more preferably 10.0%, and most preferably 5.0%. Additionally, a desired glass may be obtained even without containing every $Ln_2O_3$ component; however, by including greater than 0% of the $Ln_2O_3$ component, a desired high refractive index or a high mechanical strength may be more easily obtained. Accordingly, the lower limit of total content by mass of the $Ln_2O_3$ component based on total mass of the glass in the composition on oxide basis is preferably greater than 0%, more preferably 1.0%, and most preferably 3.0%.

The $GeO_2$ component is a component which raises a refractive index of the glass and an optional component of the optical glass of the present invention. Specifically, by adjusting the content of the $GeO_2$ component to no greater than 15.0%, degradation of fusibility of the glass may be reduced. Furthermore, when the amount of expensive $GeO_2$ component used is decreased, material cost of the glass may be lowered. Accordingly, the upper limit of the content of the $GeO_2$ component based on total mass of the glass in the composition on oxide basis is preferably 15.0%, more preferably 12.0%, and most preferably 10.0%. The $GeO_2$ component may be included into the glass using $GeO_2$ as a raw material, for example.

The $WO_3$ component is a component which lowers a glass transition temperature (Tg) and improves press formability of the glass; and an optional component of the optical glass of the present invention. Specifically, by adjusting the content of the $WO_3$ component to no greater than 15.0%, the amount of expensive $WO_3$ component used is decreased and the glass may be more easily melted at lower temperatures, thus production cost of the glass may be decreased. Accordingly, the upper limit of the content of the $WO_3$ component based on total mass of the glass in the composition on oxide basis is preferably 15.0%, more preferably 12.0%, and most preferably 10.0%. The $WO_3$ component may be included into the glass using $WO_3$ as a raw material, for example.

The $Bi_2O_3$ component and the $TeO_2$ component are a component which lowers a glass transition temperature (Tg) and raises a refractive index of the glass. Specifically, by adjusting each of the contents of the $Bi_2O_3$ and $TeO_2$ components to no greater than 15.0%, volatilization of these components during press molding may be reduced, thus tarnish on surface of the glass may be reduced. Accordingly, the upper limit of the content of these components based on total mass of the glass in the composition on oxide basis is preferably 15.0%, more preferably 10.0%, and most preferably 5.0%. The $Bi_2O_3$ and $TeO_2$ components may be included into the glass using $Bi_2O_3$ and $TeO_2$ as a raw material, for example.

The $Sb_2O_3$ component is a component which promotes defoaming of the glass and clarifies the glass; and an optional component of the optical glass of the present invention. Specifically, by adjusting the content of the $Sb_2O_3$ component to no greater than 1.0%, excessive foaming may be unlikely to occur when the glass is melted, and the $Sb_2O_3$ component may be unlikely to alloy in melting facilities (with noble metals such as Pt in particular). Accordingly, the upper limit of the content of the $Sb_2O_3$ component based on total mass of the glass in the composition on oxide basis is preferably 1.0%, more preferably 0.8%, and most preferably 0.5%. Specifically, it is preferred that the $Sb_2O_3$ component is not included when environmental effects of the optical glass are critical. The $Sb_2O_3$ component may be included into the glass using $Sb_2O_3$, $Sb_2O_5$, or $Na_2H_2Sb_2O_7 \cdot 5H_2O$ as a raw material, for example.

Additionally, the component to clarify and defoam the glass is not limited to the $Sb_2O_3$ component, and conventional clarifying agents, defoaming agents, or combination thereof in the field of glass production may be used.

Components not to be Included

Components not to be included or undesirable to include in the optical glass of the present invention are explained below.

Other components may be added to the optical glass of the present invention as required within a range not impairing the properties of the glass of the present invention.

Furthermore, transition metal components such as V, Cr, Mn, Fe, Co, Ni, Cu, Ag, and Mo except for La, Zr, Ti, Ta, Nb, W, Gd, Y, Yb, and Lu have a property in that the glass become colored even if a small amount of each or a combination thereof is included, and absorption at a certain wavelength within the visible range occurs, thus it is preferred for the optical glasses using wavelengths within the visible range in particular that these components are not included.

Besides, in recent years, use of lead compounds such as PbO, arsenic compounds such as $As_2O_3$, and elements of Th, Cd, Tl, Os, Be, and Se has been avoided from the viewpoint of harmful chemical substances, and there is a need for environmental countermeasures not only in production steps but also processing steps and disposal after production of glasses. It is therefore preferred that these are substantially not included except for inevitable inclusion when environmental effects are critical. Thereby, environmentally polluting substances are not substantially included into the optical glass. As a result, the optical glass may be produced, processed, and disposed even without taking action on a special environmental countermeasure.

Although the glass composition of the present invention is expressed in terms of mass percent based on total mass of the glass in the composition on oxide basis and thus cannot be expressed directly by mol percent, the components in the glass composition satisfying various required properties expressed by mol % are of the values below in the composition on oxide basis.

$SiO_2$ component: 1.0 to 75.0 mol %, and
$La_2O_3$ component: 0 to 7.0 mol %, and/or
$ZrO_2$ component: 0 to 10.0 mol %, and/or
$TiO_2$ component: 0 to 12.0 mol %, and/or
$Nb_2O_5$ component: 0 to 6.0 mol %, and/or
$Ta_2O_5$ component: 0 to 3.0 mol %, and/or
$Li_2O$ component: 0 to 30.0 mol %, and/or
$Na_2O$ component: 0 to 30.0 mol %, and/or
$K_2O$ component: 0 to 7.0 mol %, and/or
MgO component: 0 to 15.0 mol %, and/or
CaO component: 0 to 20.0 mol %, and/or
SrO component: 0 to 15.0 mol %, and/or
BaO component: 0 to 20.0 mol %, and/or
ZnO component: 0 to 15.0 mol %, and/or
$B_2O_3$ component: 0 to 15.0 mol %, and/or
$Al_2O_3$ component: 0 to 3.0 mol %, and/or
$Gd_2O_3$ component: 0 to 3.0 mol %, and/or
$Y_2O_3$ component: 0 to 4.0 mol %, and/or
$Yb_2O_3$ component: 0 to 3.0 mol %, and/or
$Lu_2O_3$ component: 0 to 3.0 mol %, and/or
$GeO_2$ component: 0 to 7.0 mol %, and/or
$WO_3$ component: 0 to 7.0 mol %, and/or
$Bi_2O_3$ component: 0 to 3.0 mol %, and/or
$TeO_2$ component: 0 to 7.0 mol %, and/or
$Sb_2O_3$ component: 0 to 0.3 mol %.

Production Method

The optical glass of the present invention may be produced as follows, for example. That is, the raw materials are uniformly mixed such that the contents of components are within a predetermined range, and the resulting mixture is poured into a platinum crucible, a quartz crucible, or an alumina crucible and coarsely dissolved to prepare a cullet thereof. The resulting cullet is disposed in a gold crucible, a platinum crucible, a platinum alloy crucible, or an iridium crucible, melted within a temperature range from 800° C. to 1200° C., and then stirred and homogenized, followed by forming into a desired shape and slowly cooling.

Specifically, in a case where the optical glass resulting from the procedures is used as a core material of optical fiber, the cullet resulting from the procedures is subjected to spinning together with a clad material using a conventional method.

Physical Properties

Preferably, the optical glass of the present invention exhibits a larger light intensity recovery rate after irradiation of X-rays. More specifically, when the glass having been irradiated with X-rays with a dose of 2.5 Gy is irradiated with light of a xenon lamp for 11 hours, preferably, the light intensity recovery rate from the transmitted light intensity immediately after irradiation of X-rays is no less than 45% based on 100% of light intensity in the glass before irradiation of X-rays. Thereby, even when the transmitted light has been decreased upon irradiation of X-rays, the light transmittance recovers by irradiation of source light and thus the loss of transmission light is reduced, therefore, it may be favorably used for light transmission under environment irradiated with X-rays in particular. Accordingly, in the optical glass of the present invention, the lower limit of the light intensity recovery rate when the glass having been irradiated with X-rays is irradiated with source light is preferably 45%, more preferably 50%, and most preferably 55%.

It is also preferred that the optical glass of the present invention has a desired refractive index ($n_d$). Specifically, the lower limit of refractive index ($n_d$) of the optical glass of the present invention is preferably 1.50, more preferably 1.60, and most preferably 1.63. Thereby, a numerical aperture of the optical glass is raised, thus light intensity transmitting through the glass fiber may be increased. Additionally, as the refractive index becomes higher, the optical glass of the present invention is more excellent as the core material for optical fiber, thus the upper limit is not particularly limited; in many cases, the upper limit is no greater than 2.00 for instance, specifically no greater than 1.90, and more specifically no greater than 1.80.

It is also necessary for the optical glass of the present invention that the light transmittance is as high as possible. Specifically, the internal transmittance at about 400 nm and more specifically within a wavelength range of 395 to 400 nm is preferably no less than 0.9950, more preferably no less than 0.9970, and most preferably no less than 0.9980. Thereby, the loss of light transmitting through the optical glass may be further reduced in the region of shorter wavelengths. Therefore, transmission efficiency of optical fiber may be further enhanced by forming the optical fiber from the optical glass. Additionally, in this specification, the internal transmittance at 395 to 400 nm means a minimum value of internal transmittance at wavelengths ranging from 395 nm to 400 nm.

It is also preferred in the optical glass of the present invention that an average linear expansion coefficient ($\alpha$) is within a predetermined range. Specifically, the optical glass of the present invention has an average linear expansion coefficient ($\alpha$) of preferably no greater than $110 \times 10^{-7} K^{-1}$, more preferably no greater than $108 \times 10^{-7} K^{-1}$, and most preferably no greater than $105 \times 10^{-7} K^{-1}$. Thereby, the difference of the average linear expansion coefficient from that of the clad material may be reduced when the optical glass is used as the core material for optical fiber. Therefore, thermal stress may be reduced when the core material and the clad material are combined, and thus the optical fiber with a core-clad structure of a desired shape may be obtained. Additionally, the average linear expansion coefficient ($\alpha$) is not particularly limited, but the optical glass of the present invention may have an average linear expansion coefficient ($\alpha$) of preferably no less than $85 \times 10^{-7} K^{-1}$, more preferably no less than $88 \times 10^{-7} K^{-1}$, and most preferably no less than $90 \times 10^{-7} K^{-1}$. Thereby, when the optical glass is used as the core material for optical fiber, the average linear expansion coefficient may be adequately higher than that of the clad material which often has a lower refractive index and contains a large amount of glass-forming components such as $SiO_2$ and $B_2O_3$ components. Therefore, bending strength of the optical fiber with a core-clad structure formed from the core material and the clad material may be enhanced.

Core Material for Optical Fiber

The optical glass of the present invention may be used as the core material for optical fiber in particular, thereby the proportion of light transmitting inside the core material may be increased, thus the core material for optical fiber with a lower loss in light transmission can be provided. Here, in order to prepare the optical fiber from the optical glass of the present invention, conventional methods such as double crucible methods using coarsely dissolved cullet can be employed.

EXAMPLES

Tables 1 to 4 show compositions of Examples (Nos. 1 to 27) of the present invention and Comparative Example (No. A) and results of refractive index ($n_d$), Abbe number ($v_d$), light intensity recovery rate, and transparent wavelengths ($\lambda_{70}$, $\lambda_5$) exhibiting 70% and 5% of spectral transmittance of these glasses. Here, Examples below are merely for exemplification, and these Examples are not definitive.

In regards to the optical glasses of Examples (Nos. 1 to 27) of the present invention and the glass of Comparative Example (No. A), highly pure raw materials such as oxides, hydroxides, carbonates, nitrates, fluorides, hydroxides, and meta-phosphate compounds, having been used for conventional optical glasses correspondingly as raw materials thereof, were respectively selected and weighed in a compositional ratio of Examples shown in Tables 1 to 4 and then uniformly mixed, and subsequently poured into a quartz crucible to melt the raw materials, thereby preparing a cullet. Then the cullet was poured into a double crucible formed of a platinum alloy and melted in an electric furnace at a temperature range from 800° C. to 1200° C. for 1 to 12 hours depending on a melting-difficulty level of glass compositions and uniformly stirred, then which was formed into a fiber shape of diameter 30 to 100 μm and cut into a length of 1 meter, thereby preparing a glass fiber for a recovery test.

Here, the light intensity recovery rate of the glasses of Examples (Nos. 1 to 27) and the glass of Comparative Example (No. A) was measured as follows. That is, the glasses were irradiated with X-rays generated from a commercially available X-ray irradiation apparatus for medical purposes. The dose of X-rays absorbed by the glasses was controlled to be 2.5 Gy. Then, the glasses having been irradiated with X-rays were intermittently irradiated with the source light emitted from a commercially available xenon lamp for 11 hours. At this time, the transmitted light intensity through the glasses was measured before X-ray irradiation, immediately after X-ray irradiation, and immediately after source light irradiation, and the recovery rate (%) of light intensity from the transmitted light intensity immediately after X-ray irradiation was determined based on 100% of the light intensity of the glass before X-ray irradiation.

Here, the refractive index ($n_d$) and Abbe number ($v_d$) of the glasses of Examples (Nos. 1 to 27) and the glass of Comparative Example (No. A) were determined with respect to the glasses slowly cooled at a temperature-lowering speed of −25° C./hr from the measurement in accordance with Japanese Optical Glass Industrial Standards JOGIS01-2003.

The transmittance of the glasses of Examples (Nos. 1 to 27) and Comparative Example (No. A) was measured in accordance with Japanese Optical Glass Industrial Standards JOGIS02. Additionally, existence or nonexistence of coloring and its degree of the glasses were determined by measuring a transmittance of the glasses. Specifically, an object polished face-to-face in parallel to a width of 10±0.1 mm was measured for spectral transmittance of 200 to 800 nm in accordance with JIS Z8722 to determine $\lambda_5$ and $\lambda_{70}$ (wavelengths at 5% and 70% of transmittance).

Furthermore, in regards to the glasses of Examples (Nos. 1 to 27) and Comparative Example (No. A), an internal transmittance at 395 to 400 nm was measured from two samples with different thicknesses in accordance with "Measuring Method of Internal Transmittance of Optical Glass" of Japanese Optical Glass Industrial Standards JOGIS17-1982. Additionally, the samples used for measuring the internal transmittance were those with a thickness of 10 mm or 50 mm.

TABLE 1

|  | Example | | | | | | | |
|---|---|---|---|---|---|---|---|---|
|  | 1 | 2 | 3 | 4 | 5 | 6 | 7 | 8 |
| $SiO_2$ | 43.36 | 44.90 | 44.90 | 44.90 | 43.36 | 43.36 | 41.36 | 39.36 |
| $La_2O_3$ | 15.00 | 14.00 | 4.00 | 4.00 | 5.00 | 5.00 | 5.00 | 5.00 |
| $ZrO_2$ | 0.00 | 4.00 | 4.00 | 4.00 | 0.00 | 0.00 | 7.00 | 9.00 |
| $TiO_2$ | 0.00 | 0.00 | 0.00 | 0.00 | 0.00 | 0.00 | 0.00 | 0.00 |
| $Nb_2O_5$ | 0.00 | 0.00 | 5.00 | 0.00 | 0.00 | 0.00 | 0.00 | 0.00 |
| $Ta_2O_5$ | 0.00 | 0.00 | 0.00 | 5.00 | 0.00 | 5.00 | 0.00 | 0.00 |
| $Li_2O$ | 0.00 | 0.00 | 0.00 | 0.00 | 0.00 | 0.00 | 0.00 | 0.00 |
| $Na_2O$ | 6.96 | 7.00 | 7.00 | 7.00 | 6.96 | 6.96 | 6.96 | 6.96 |
| $K_2O$ | 0.61 | 3.00 | 3.00 | 3.00 | 0.61 | 0.61 | 0.61 | 0.61 |
| CaO | 2.98 | 0.00 | 0.00 | 0.00 | 2.98 | 2.98 | 2.98 | 2.98 |
| SrO | 0.00 | 0.00 | 0.00 | 0.00 | 6.19 | 6.19 | 6.19 | 6.19 |
| BaO | 23.76 | 15.10 | 20.10 | 20.10 | 27.57 | 22.57 | 22.57 | 22.57 |
| ZnO | 7.20 | 12.00 | 12.00 | 12.00 | 7.20 | 7.20 | 7.20 | 7.20 |
| $B_2O_3$ | 0.00 | 0.00 | 0.00 | 0.00 | 0.00 | 0.00 | 0.00 | 0.00 |
| $Al_2O_3$ | 0.14 | 0.00 | 0.00 | 0.00 | 0.14 | 0.14 | 0.14 | 0.14 |
| $Yb_2O_3$ | 0.00 | 0.00 | 0.00 | 0.00 | 0.00 | 0.00 | 0.00 | 0.00 |
| $GeO_2$ | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 |
| $Sb_2O_3$ | 0.00 | 0.20 | 0.20 | 0.20 | 0.10 | 0.10 | 0.10 | 0.10 |
| PbO | 0.00 | 0.00 | 0.00 | 0.00 | 0.00 | 0.00 | 0.00 | 0.00 |
| TOTAL | 100.0 | 100.2 | 100.2 | 100.2 | 100.1 | 100.1 | 100.1 | 100.1 |
| $La_2O_3 + ZrO_2 + TiO_2 + Nb_2O_5 + Ta_2O_5$ | 15.00 | 18.00 | 13.00 | 13.00 | 5.00 | 10.00 | 12.00 | 14.00 |
| $La_2O_3 + ZrO_2 + Ta_2O_5$ | 15.00 | 18.00 | 8.00 | 13.00 | 5.00 | 10.00 | 12.00 | 14.00 |
| $La_2O_3 + ZrO_2 + Nb_2O_5$ | 15.00 | 18.00 | 13.00 | 8.00 | 5.00 | 5.00 | 12.00 | 14.00 |
| $Rn_2O$ | 7.57 | 10.00 | 10.00 | 10.00 | 7.57 | 7.57 | 7.57 | 7.57 |
| $Na_2O + K_2O$ | 7.57 | 10.00 | 10.00 | 10.00 | 7.57 | 7.57 | 7.57 | 7.57 |
| RO | 33.94 | 27.10 | 32.10 | 32.10 | 43.94 | 38.94 | 38.94 | 38.94 |
| $Ln_2O_3$ | 15.00 | 14.00 | 4.00 | 4.00 | 5.00 | 5.00 | 5.00 | 5.00 |
| nd | 1.611 | 1.608 | 1.611 | 1.609 | 1.601 | 1.605 | 1.619 | 1.632 |
| vd | 53.3 | 52.4 | 49.1 | 48.8 | 54.6 | 52.8 | 52.3 | 50.9 |
| Light intensity recovery rate (%) | 97.54 | 83.67 | 95.85 | 82.33 | 87.60 | 91.18 | 92.55 | 91.82 |
| Internal transmittance 396 nm | 0.999 | 0.999 | 0.999 | 0.999 | 0.999 | 0.999 | 0.999 | 0.999 |
| 397 nm | 0.999 | 0.999 | 0.999 | 0.999 | 0.999 | 0.999 | 0.999 | 0.999 |
| 398 nm | 0.999 | 0.999 | 0.999 | 0.999 | 0.999 | 0.999 | 0.999 | 0.999 |
| 399 nm | 0.999 | 0.999 | 0.999 | 0.999 | 0.999 | 0.999 | 0.999 | 0.999 |

TABLE 2

|  | Example | | | | | | | | | |
|---|---|---|---|---|---|---|---|---|---|---|
|  | 9 | 10 | 11 | 12 | 13 | 14 | 15 | 16 | 17 | 18 |
| $SiO_2$ | 38.36 | 39.36 | 39.36 | 39.36 | 41.50 | 39.50 | 39.50 | 39.50 | 39.50 | 39.50 |
| $La_2O_3$ | 5.00 | 5.00 | 5.00 | 8.00 | 5.00 | 8.00 | 8.00 | 8.00 | 8.00 | 8.00 |
| $ZrO_2$ | 7.00 | 9.00 | 11.00 | 9.00 | 11.00 | 9.00 | 11.00 | 11.00 | 11.00 | 11.00 |
| $TiO_2$ | 0.00 | 0.00 | 0.00 | 0.00 | 0.00 | 0.00 | 0.00 | 0.00 | 0.00 | 0.00 |
| $Nb_2O_5$ | 0.00 | 1.14 | 0.00 | 0.00 | 0.00 | 0.00 | 0.00 | 0.00 | 0.00 | 0.00 |
| $Ta_2O_5$ | 3.00 | 0.00 | 0.00 | 0.00 | 0.00 | 2.00 | 3.00 | 0.00 | 0.00 | 0.00 |
| $Li_2O$ | 0.00 | 0.00 | 0.00 | 0.00 | 0.00 | 0.00 | 0.00 | 0.00 | 0.00 | 0.00 |
| $Na_2O$ | 6.96 | 6.96 | 6.96 | 6.96 | 6.96 | 6.96 | 6.96 | 6.96 | 6.96 | 6.96 |
| $K_2O$ | 0.61 | 0.61 | 0.61 | 0.61 | 0.61 | 0.61 | 0.61 | 0.61 | 0.61 | 0.61 |
| CaO | 2.98 | 2.98 | 2.98 | 2.98 | 2.98 | 2.98 | 2.98 | 2.98 | 2.98 | 2.98 |
| SrO | 6.19 | 6.19 | 6.19 | 6.19 | 6.19 | 6.19 | 6.19 | 6.19 | 6.19 | 6.19 |
| BaO | 22.57 | 21.57 | 20.57 | 19.57 | 18.57 | 17.57 | 14.57 | 17.57 | 17.57 | 17.57 |
| ZrO | 7.20 | 7.20 | 7.20 | 7.20 | 7.20 | 7.20 | 7.20 | 7.20 | 7.20 | 7.20 |
| $B_2O_3$ | 0.00 | 0.00 | 0.00 | 0.00 | 0.00 | 0.00 | 0.00 | 0.00 | 0.00 | 0.00 |
| $Al_2O_3$ | 0.14 | 0.00 | 0.14 | 0.14 | 0.00 | 0.00 | 0.00 | 0.00 | 0.00 | 0.00 |
| $Yb_2O_3$ | 0.00 | 0.00 | 0.00 | 0.00 | 0.00 | 0.00 | 0.00 | 0.00 | 0.00 | 1.00 |

TABLE 2-continued

|  | Example | | | | | | | | | |
|---|---|---|---|---|---|---|---|---|---|---|
|  | 9 | 10 | 11 | 12 | 13 | 14 | 15 | 16 | 17 | 18 |
| $GeO_2$ | 0.00 | 0.00 | 0.00 | 0.00 | 0.00 | 0.00 | 0.00 | 0.00 | 0.00 | 0.00 |
| $Bi_2O_3$ | 0.00 | 0.00 | 0.00 | 0.00 | 0.00 | 0.00 | 0.00 | 0.00 | 0.00 | 0.00 |
| $Sb_2O_3$ | 0.10 | 0.10 | 0.10 | 0.10 | 0.10 | 0.10 | 0.10 | 0.10 | 1.00 | 0.10 |
| PbO | 0.00 | 0.00 | 0.00 | 0.00 | 0.00 | 0.00 | 0.00 | 0.00 | 0.00 | 0.00 |
| TOTAL | 100.1 | 100.1 | 100.1 | 100.1 | 100.1 | 100.1 | 100.1 | 100.1 | 101.0 | 101.1 |
| $La_2O_3 + ZrO_2 + TiO_2 + Nb_2O_5 + Ta_2O_5$ | 15.00 | 15.14 | 16.00 | 17.00 | 16.00 | 19.00 | 22.00 | 19.00 | 19.00 | 19.00 |
| $La_2O_3 + ZrO_2 + Ta_2O_5$ | 15.00 | 14.00 | 16.00 | 17.00 | 16.00 | 19.00 | 22.00 | 19.00 | 19.00 | 19.00 |
| $La_2O_3 + ZrO_2 + Nb_2O_5$ | 12.00 | 15.14 | 16.00 | 17.00 | 16.00 | 17.00 | 19.00 | 19.00 | 19.00 | 19.00 |
| $Rn_2O$ | 7.57 | 7.57 | 7.57 | 7.57 | 7.57 | 7.57 | 7.57 | 7.57 | 7.57 | 7.57 |
| $Na_2O + K_2O$ | 7.57 | 7.57 | 7.57 | 7.57 | 7.57 | 7.57 | 7.57 | 7.57 | 7.57 | 7.57 |
| RO | 38.94 | 37.94 | 36.94 | 35.94 | 34.94 | 33.94 | 30.94 | 33.94 | 33.94 | 33.94 |
| $Ln_2O_3$ | 5.00 | 5.00 | 5.00 | 8.00 | 5.00 | 8.00 | 8.00 | 8.00 | 8.00 | 9.00 |
| nd | 1.632 | 1.635 | 1.636 | 1.636 | 1.631 | 1.634 | 1.643 | 1.633 | 1.639 | 1.640 |
| vd | 50.6 | 50.2 | 50.5 | 50.6 | 64.6 | 51.0 | 48.8 | 49.0 | 49.8 | 50.3 |
| Light intensity recovery rate (%) | 94.69 | 98.61 | 94.21 | 93.59 | 92.68 | 93.56 | 89.31 | 90.71 | 84.44 | 88.76 |
| Internal transmittance 396 nm | 0.999 | 0.999 | 0.999 | 0.999 | 0.999 | 0.999 | 0.999 | 0.999 | 0.999 | 0.999 |
| 397 nm | 0.999 | 0.999 | 0.999 | 0.999 | 0.999 | 0.999 | 0.999 | 0.999 | 0.999 | 0.999 |
| 398 nm | 0.999 | 0.999 | 0.999 | 0.999 | 0.999 | 0.999 | 0.999 | 0.999 | 0.999 | 0.999 |
| 399 nm | 0.999 | 0.999 | 0.999 | 0.999 | 0.999 | 0.999 | 0.999 | 0.999 | 0.999 | 0.999 |

TABLE 3

|  | Example | | | Comparative Example |
|---|---|---|---|---|
|  | 19 | 20 | 21 | A |
| $SiO_2$ | 44.90 | 43.20 | 39.50 | 30.69 |
| $La_2O_3$ | 8.00 | 6.50 | 5.00 | 5.18 |
| $ZrO_2$ | 8.00 | 9.50 | 11.00 | 0.00 |
| $TiO_2$ | 0.00 | 0.00 | 0.00 | 0.00 |
| $Nb_2O_5$ | 5.00 | 2.50 | 0.00 | 0.00 |
| $Ta_2O_5$ | 0.00 | 0.00 | 0.00 | 2.73 |
| $Li_2O$ | 0.00 | 0.00 | 0.00 | 0.96 |
| $Na_2O$ | 7.00 | 6.98 | 6.96 | 0.10 |
| $K_2O$ | 3.00 | 1.81 | 0.61 | 0.39 |
| CaO | 0.00 | 1.49 | 2.98 | 3.42 |
| SrO | 0.00 | 3.10 | 0.00 | 0.00 |
| BaO | 12.10 | 15.33 | 26.76 | 38.30 |
| ZnO | 12.00 | 9.60 | 7.20 | 4.33 |
| $B_2O_3$ | 0.00 | 0.00 | 0.00 | 11.28 |
| $Al_2O_3$ | 0.00 | 0.00 | 0.00 | 2.61 |
| $Yb_2O_3$ | 0.00 | 0.00 | 0.00 | 0.00 |
| $GeO_2$ | 0.00 | 0.00 | 0.00 | 0.00 |
| $Bi_2O_3$ | 0.00 | 0.00 | 0.00 | 0.00 |
| $Sb_2O_3$ | 0.10 | 0.10 | 0.10 | 0.01 |
| PbO | 0.00 | 0.00 | 0.00 | 0.00 |
| TOTAL | 100.1 | 100.1 | 100.1 | 100.0 |
| $La_2O_3 + ZrO_2 + TiO_2 + Nb_2O_5 + Ta_2O_5$ | 21.00 | 18.50 | 16.00 | 7.91 |
| $La_2O_3 + ZrO_2 + Ta_2O_5$ | 16.00 | 16.00 | 16.00 | 7.91 |
| $La_2O_3 + ZrO_2 + Nb_2O_5$ | 21.00 | 18.50 | 16.00 | 5.18 |
| $Rn_2O$ | 10.00 | 8.79 | 7.57 | 1.45 |
| $Na_2O + K_2O$ | 10.00 | 8.79 | 7.57 | 0.49 |
| RO | 24.10 | 29.52 | 36.94 | 46.05 |
| $Ln_2O_3$ | 8.00 | 6.50 | 5.00 | 5.18 |
| nd | 1.625 | 1.628 | 1.635 | 1.6308 |
| vd | 50.0 | 49.4 | 50.3 | 56.4 |
| Light intensity recovery rate (%) | 93.74 | 91.39 | 91.21 | 37.0 |
| Internal transmittance 396 nm | 0.996 | 0.998 | 0.998 | 0.997 |
| 397 nm | 0.997 | 0.998 | 0.999 | 0.997 |
| 398 nm | 0.998 | 0.999 | 0.999 | 0.997 |
| 399 nm | 0.999 | 0.999 | 0.999 | 0.997 |

TABLE 4

|  | Example | | | | | |
|---|---|---|---|---|---|---|
|  | 22 | 23 | 24 | 25 | 26 | 27 |
| $SiO_2$ | 41.97 | 40.74 | 43.32 | 41.97 | 41.45 | 38.58 |
| $La_2O_3$ | 5.18 | 5.29 | 5.34 | 5.18 | 5.18 | 4.76 |
| $ZrO_2$ | 2.61 | 2.66 | 2.69 | 2.61 | 2.61 | 2.40 |
| $TiO_2$ | 0.00 | 0.00 | 0.00 | 0.00 | 0.00 | 0.00 |
| $Nb_2O_5$ | 2.07 | 0.00 | 2.14 | 0.00 | 4.66 | 9.99 |
| $Ta_2O_5$ | 2.73 | 2.79 | 2.82 | 2.73 | 2.73 | 2.51 |
| $Li_2O$ | 4.07 | 4.16 | 3.13 | 4.07 | 0.00 | 3.74 |
| $Na_2O$ | 0.10 | 2.22 | 2.24 | 0.10 | 4.17 | 0.10 |
| $K_2O$ | 0.39 | 0.40 | 0.41 | 0.39 | 0.39 | 0.36 |
| CaO | 3.42 | 3.49 | 5.66 | 5.49 | 3.42 | 3.14 |
| SrO | 0.00 | 0.00 | 0.00 | 0.00 | 0.00 | 0.00 |
| BaO | 33.12 | 33.82 | 27.77 | 33.12 | 31.05 | 30.44 |
| ZnO | 4.33 | 4.42 | 4.47 | 4.33 | 4.33 | 3.98 |
| $B_2O_3$ | 0.00 | 0.00 | 0.00 | 0.00 | 0.00 | 0.00 |
| $Al_2O_3$ | 0.00 | 0.00 | 0.00 | 0.00 | 0.00 | 0.00 |

TABLE 4-continued

| | | Example | | | | | |
|---|---|---|---|---|---|---|---|
| | | 22 | 23 | 24 | 25 | 26 | 27 |
| | $Yb_2O_3$ | 0.00 | 0.00 | 0.00 | 0.00 | 0.00 | 0.00 |
| | $GeO_2$ | 0.00 | 0.00 | 0.00 | 0.00 | 0.00 | 0.00 |
| | $Bi_2O_3$ | 0.00 | 0.00 | 0.00 | 0.00 | 0.00 | 0.00 |
| | $Sb_2O_3$ | 0.01 | 0.01 | 0.01 | 0.00 | 0.01 | 0.00 |
| | PbO | 0.00 | 0.00 | 0.00 | 0.00 | 0.00 | 0.00 |
| | TOTAL | 100.0 | 100.0 | 100.0 | 100.0 | 100.0 | 100.0 |
| | $La_2O_3 + ZrO_2 + TiO_2 + Nb_2O_5 + Ta_2O_5$ | 12.59 | 10.74 | 13.00 | 10.52 | 15.18 | 19.66 |
| | $La_2O_3 + ZrO_2 + Ta_2O_5$ | 10.52 | 10.74 | 10.86 | 10.52 | 10.52 | 9.67 |
| | $La_2O_3 + ZrO_2 + Nb_2O_5$ | 9.86 | 7.95 | 10.17 | 7.79 | 12.45 | 17.15 |
| | $Rn_2O$ | 4.57 | 6.78 | 5.78 | 4.57 | 4.57 | 4.20 |
| | $Na_2O + K_2O$ | 0.50 | 2.62 | 2.65 | 0.50 | 4.57 | 0.46 |
| | RO | 40.86 | 41.73 | 37.90 | 42.94 | 38.79 | 37.56 |
| | $Ln_2O_3$ | 5.18 | 5.29 | 5.34 | 5.18 | 5.18 | 4.76 |
| | $n_d$ | 1.63834 | 1.63319 | 1.63549 | 1.63767 | 1.63865 | 1.67177 |
| | $v_d$ | 51.8 | 51.6 | 51.4 | 53.0 | 52.0 | 46.4 |
| | Light intensity recovery rate (%) | 80.31 | 86.82 | 88.51 | 93.68 | 92.34 | 93.00 |
| Internal transmittance | 396 nm | 0.999 | 0.999 | 0.999 | 0.998 | 0.998 | 0.997 |
| | 397 nm | 0.999 | 0.999 | 0.999 | 0.999 | 0.999 | 0.998 |
| | 398 nm | 0.999 | 0.999 | 0.999 | 0.999 | 0.999 | 0.999 |
| | 399 nm | 0.999 | 0.999 | 0.999 | 0.999 | 0.999 | 0.999 |

As shown in Tables 1 to 4, when the optical glasses of Examples of the present invention were irradiated with the source light, the light intensity recovery rate of the glasses having been irradiated with X-rays was no less than 45.0% and still particularly no less than 70.0%. On the other hand, the light intensity recovery rate was less than 45.0% in the glass of Comparative Example A. It has therefore been demonstrated that the light intensity recovery rate of the optical glasses of Examples of the present invention is larger than that of the glass of Comparative Example A when the gasses having been irradiated with X-rays are irradiated with the source light for a predetermined period.

Furthermore, in regards to all of the optical glasses of Examples of the present invention, the refractive index ($n_d$) was no less than 1.50 and still particularly no less than 1.60, and the refractive index ($n_d$) was no greater than 2.00 and still particularly no greater than 1.80, which represents a desired range.

Furthermore, in regards to all of the optical glasses of Examples of the present invention, the internal transmittance at 395 to 400 nm was no less than 0.995, which represents a desired range.

It has therefore been demonstrated that the optical glasses of Examples of the present invention have a high refractive index ($n_d$) and also represent a high transmittance over a wider range of wavelengths of visible range while having a large recovery of light intensity after X-ray irradiation.

As described above, the present invention is explained in detail for the purpose of exemplification; however, these Examples are merely for the purpose of exemplification, and it will be understood that those skilled in the art can make many changes or modifications without departing from the spirit and scope of the present invention.

The invention claimed is:
1. An optical glass, comprising an $SiO_2$ component of no less than 1.0% and no greater than 60.0% by mass percent based on total mass of the glass in terms of oxide composition,
a $La_2O_3$ component content of greater than 4.0% and no greater than 15.0%,
a $ZrO_2$ component content of no less than 2.40% and no greater than 20.0%,
a $TiO_2$ component content of 0 to 5%,
an $Al_2O_3$ component content of 0 to 0.14%,
a MgO component content of 0 to 5.0%,
a CaO component content of 0 to 7.0%,
a SrO component content of 0 to 20.0%,
a BaO component content of 0 to 40.0%,
a ZnO component content of 0 to 20.0%,
a $B_2O_3$ component content of 0 to 10.0%,
a $GeO_2$ component content of 0 to 15.0%,
a $WO_3$ component content of 0 to 15.0%,
a $Bi_2O_3$ component content of 0 to 15.0%,
a $TeO_2$ component content of 0 to 15.0%,
a $Sb_2O_3$ component content of 0 to 1.0%,
substantially no lead compound,
a total mass percentage of ($Na_2O+K_2O$) of no less than 0.1% and no greater than 8.79%,
a total mass of a $La_2O_3$ component, a $ZrO_2$ component, a $TiO_2$ component, a $Nb_2O_5$ component and a $Ta_2O_5$ component is no less than 10.52% and no greater than 30.0% and
having a refractive index ($n_d$) of no less than 1.50, wherein a light intensity recovery rate is no less than 45% when the glass having been irradiated with X-rays with a dose of 2.5 Gy is irradiated with light of a xenon lamp for 11 hours.
2. The optical glass according to claim 1, wherein the content of the $SiO_2$ component is no greater than 50.0% by mass percent based on total mass of the glass in terms of oxide composition.
3. The optical glass according to claim 1, wherein the optical glass comprises 0% to 15.0% of the $Nb_2O_5$ component, and/or 0% to 10.0% of the $Ta_2O_5$ component by mass percent based on total mass of the glass in terms of oxide composition.
4. The optical glass according to claim 1, wherein the content of the $Li_2O$ component is no greater than 5.0% by mass percent based on total mass of the glass in terms of oxide composition.

5. The optical glass according to claim 1, wherein the total mass of an $Rn_2O$ component (Rn: Li, Na, and K) is no greater than 20.0% by mass percent based on total mass of the glass in terms of oxide composition.

6. The optical glass according to claim 1, wherein the total mass of the RO component (R: at least one selected from the group consisting of Mg, Ca, Sr, Ba, and Zn) is no greater than 50.0% by mass percent based on total mass of the glass in terms of oxide composition.

7. The optical glass according to claim 1, wherein the content of the BaO component is less than 28.0% by mass percent based on total mass of the glass in terms of oxide composition.

8. The optical glass according to claim 1, wherein the optical glass further comprises 0% to 15.0% of a $Gd_2O_3$ component, and/or 0% to 10.0% of a $Y_2O_3$ component, and/or 0% to 10.0% of a $Yb_2O_3$ component, and/or 0% to 10.0% of a $Lu_2O_3$ component by mass percent based on total mass of the glass in terms of oxide composition.

9. The optical glass according to claim 8, wherein the total mass of a $Ln_2O_3$ component (Ln: La, Gd, Y, Yb, and Lu) is no less than 4.76% and no greater than 20.0% by mass percent based on total mass of the glass in terms of oxide composition.

10. The optical glass according to claim 1, comprising substantially no arsenic compound.

11. The optical glass according to claim 1, wherein internal transmittance at 395 to 400 nm thereof is no less than 0.9950.

12. The optical glass according to claim 1, having a refractive index ($n_d$) of no less than 1.60 and no greater than 2.00.

13. A core material for optical fiber, comprising the optical glass according to claim 1.

14. The optical glass according to claim 1, wherein the optical glass further comprises 0% to 15.0% of a $Li_2O$ component, and/or 0% to 6.98% of a $Na_2O$ component, and/or 0% to 8.0% of a $K_2O$ component by mass percent based on total mass of the glass in terms of oxide composition.

* * * * *